US006941483B2

United States Patent
Brown et al.

(10) Patent No.: US 6,941,483 B2
(45) Date of Patent: Sep. 6, 2005

(54) BUS CAPABILITY VOTING MECHANISM

(75) Inventors: John M. Brown, Austin, TX (US); James E. Holeman, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 621 days.

(21) Appl. No.: 10/038,798

(22) Filed: Dec. 31, 2001

(65) Prior Publication Data

US 2003/0126334 A1 Jul. 3, 2003

(51) Int. Cl.[7] .................................................. G06F 1/04
(52) U.S. Cl. ........................... 713/500; 713/600; 710/8; 710/301
(58) Field of Search ................................ 713/500, 600; 710/8, 301

(56) References Cited

U.S. PATENT DOCUMENTS 5,678,065 A * 10/1997 Lee et al. ...................... 710/60
6,510,473 B1 * 1/2003 Voit .............................. 710/58
6,782,438 B1 * 8/2004 Duncan et al. .............. 710/104

OTHER PUBLICATIONS

"PCI–X: An Evolution of the PCI Bus"; Technology Brief, ISSD Technology Communications, Compaq Computer Corporation, Sep. 1999 (pp. 1–13).

* cited by examiner

Primary Examiner—Thomas Lee
Assistant Examiner—Nirav Amin

(57) ABSTRACT

A computer system is disclosed having a bus capability determination mechanism. In a preferred embodiment, the computer system includes a backplane having sockets into which system and peripheral boards may be inserted. The sockets are coupled together by a backplane bus that includes a bus capability line. Each board preferably includes a voting circuit that, when enabled, limits the voltage on the capability signal line to no more than a predetermined voltage that is indicative of the capability of the board. The voltage on the capability signal line will thus be determined by the board having the lowest voltage limit. The clock source for the bus can then be set to the clock rate indicated by the voltage on the capability signal line. Zener devices are preferably used to carry out the voting operation, and may be disabled after the voting operation is complete.

20 Claims, 2 Drawing Sheets

BUS CAPABILITY VOTING MECHANISM

BACKGROUND OF THE INVENTION

1. Field of the Invention

The present invention generally relates to electronic communication between computer components, and more particularly, to a mechanism and method for determining a capability of a various components coupled to a bus.

2. Background of the Invention

Computer systems include a number of modular components with specialized functions that cooperatively interact to realize the many features of modern computer systems. The ability of these various components to exchange data and other signals is vital to the successful operation of a computer system. One of the critical requirements in designing a new computer system is that all system components (including those that may be added to the system by a user) must be compatible. A component is compatible if it effectively communicates and transfers data without interfering with the operation of other system components.

As an example, some of the early computer systems included a processor (or CPU), random access memory (RAM), and certain peripheral devices such as a floppy drive, a keyboard and a display. These components typically were coupled together using a network of address, data and control lines, commonly referred to as a "bus". As computer technology evolved, it became common to connect additional peripheral devices to the computer through ports (such as a parallel port or a serial port), or through sockets on the main system circuit board (or "motherboard") that are connected to the system's bus. One early bus that still is in use today is the Industry Standard Architecture (ISA) bus. The ISA bus, as the name implies, was a bus standard adopted by computer manufacturers to permit the manufacturers of peripheral devices to design devices that would be compatible with most computer systems. The ISA bus includes 16 data lines and 24 address lines and operates at a clock speed of 8 MHz. A large number of peripheral components have been developed over the years to operate with the ISA protocol.

The components which couple to a given bus receive data from the other components on the same bus via the bus signal lines, and selected components may operate in turn as "bus masters" to send data to other components over the bus. Accordingly, each component on the bus circuit operates according to a protocol associated with that bus which defines the purpose of each bus signal and regulates such parameters as bus speed and arbitration between components requesting bus mastership. A bus protocol also determines the proper sequence of bus signals for transferring data over the bus. As computer systems have continued to evolve, new bus circuits offering heightened functionality have replaced older bus circuits, allowing existing components to transfer data more effectively.

An improved bus architecture called the Extended Industry Standard Architecture (EISA) increased the bus data width to 32 bits, and added a way to exchange data without the assistance of the CPU. The EISA bus protocol permits system components residing on the EISA bus to obtain mastership of the bus and to run cycles on the bus independently of the CPU.

Currently, the most popular computer bus is the Peripheral Component Interconnect (PCI) bus. Like the EISA bus, the PCI bus has bus master capabilities and a 32-bit data path. The PCI bus operates at clock speeds of 33 MHz or faster. Revisions to the PCI bus standard allow for clock speeds up to 66 MHz, and allow a 64-bit data path.

The newest bus architecture, PCI-X, is based on the PCI bus. It has a 64-bit data path, and a clock speed of up to 133 MHz, but remains backward-compatible with conventional PCI components. Thus, PCI-X components can operate at 33 MHz, 66 MHz, and 133 MHz. The PCI-X components may also support 50 MHz and 100 MHz operation to allow multiple components on each segment of the PCI-X bus.

The PCI-X bus offers a raw bandwidth of up to 1 gigabyte per second, making it attractive for high-performance system designers. Such systems may include commercial servers needing an "always-on" capability. In such systems, maintenance is performed while the computers are running, so the components must be "hot-swapped", i.e. removed and inserted from bus connectors while the computer continues operating.

To benefit such systems, a new specification called "Compact PCI" is being developed to accommodate PCI-X bus- and PCI bus-compatible modules on a mix-or-match basis in an industrially-robust package. However, a challenge exists. How can the various bus components quickly determine the maximum frequency supported by the existing bus configuration, and how can that information be properly conveyed to components added while the system is in operation?

BRIEF SUMMARY OF THE INVENTION

The problems noted above are solved in large part by a computer system having a bus capability voting mechanism. In a preferred embodiment, the computer system includes a backplane having sockets into which system and peripheral boards may be inserted. The sockets are coupled together by a backplane bus that includes a bus capability line. Each board preferably includes a voting circuit that, when enabled, limits the voltage on the capability signal line to no more than a predetermined voltage that is indicative of the capability of the board. The voltage on the capability signal line will thus be determined by the board having the lowest voltage limit. The clock source for the bus can then be set to the clock rate indicated by the voltage on the capability signal line. Zener diodes are preferably used to carry out the voting operation, and may be disabled after the voting operation is complete.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

When digital logic signals are described, the term "asserted" means that an active-high signal is driven high, or that an active-low signal is driven low. Conversely, "de-asserted" means that an active-high signal is driven low, or that an active-low signal is driven high. Active-low signals are conventionally denoted by the use of an overbar or a number sign (#) in the name.

The term "zener device" used herein refers to any device whose current-voltage curve has a quadrant-III constant-voltage breakdown characteristic. The device may be an appropriately-doped PN junction (a true zener diode), or it may consist of a closed-loop gain block and current sink that provide a relatively constant voltage over a range of currents and an insignificant current over a range of voltages below the "breakdown" voltage in a manner similar to that of a zener diode. Three-terminal zener devices are "programmable", meaning that the limit voltage can be adjusted. Such devices are well known, and additional details may be found in Horowitz and Hill, The Art of Electronics, 2ed., ©1989 Cambridge University Press, Cambridge, pp. 331–41.

DETAILED DESCRIPTION OF THE PREFERRED EMBODIMENTS

Figure 1:
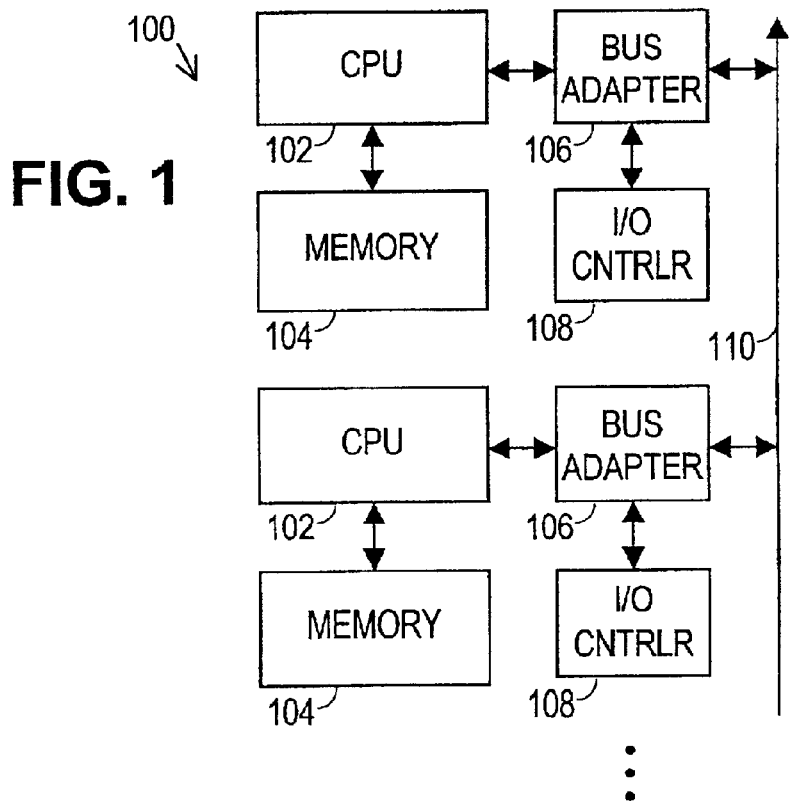
FIG. 1 shows a block diagram of a computer system.

Turning now to the figures, FIG. 1 shows a block diagram of a computer system 100 in accordance with the preferred embodiment. The system 100 includes one or more processors 102 each coupled to a local memory 104. Bus adapters 106 couple the processors 102 to corresponding I/O controllers 108, which may in turn be coupled to user input devices (e.g. a keyboard, mouse), output devices (e.g. display, printers), and,or long-term storage (e.g. hard disk drives, disk arrays, optical disks). A backplane bus 110 couples the bus adapters to each other. In the preferred embodiment, the backplane bus is a PCI-X bus that incorporates a capability determination mechanism.

The capability determination mechanism is based on a single signal line in the PCI-X bus. This signal line (PCIXCAP) has a voltage that indicates the maximum bus clock speed that is supported by the attached adapters. In the preferred embodiment, the voltage-speed relationship is as follows:

| Voltage | Allowed Range | Clock |
|---------|---------------|-------|
| 0       | <1.4 V        | 33 MHz (non-PCI-X) |
| 2.4 V   | 1.4–2.85 V    | 66 MHz |
| 3.3 V   | 2.85–3.75 V   | 100 MHz |
| 4.2 V   | >3.75 V       | 133 MHz |

Of course, it is understood that other relationships may be established, having different numbers of voltages, different voltage levels, and/or different meanings, without departing from the scope of the contemplated embodiments. These voltages are preferred because the high voltage provides sufficient "headroom" to allow for imperfections in circuit components, and all but the lowest voltage exceed the standard 2.4 V threshold for a digital high voltage. Nevertheless, other voltages are also contemplated and may be preferred in other systems. Further, the capability voting mechanism may be used to establish other capabilities besides clock speed.

Figure 2:
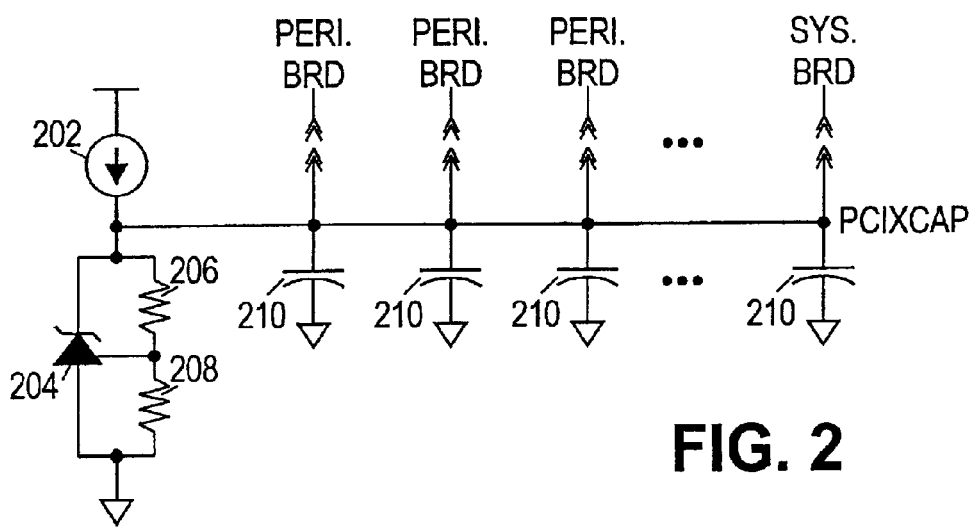
FIG. 2 shows a schematic for a preferred backplane capability circuit.

Referring now to FIG. 2, a schematic for the preferred embodiment of the backplane portion is shown. The PCIX-CAP line is powered by a current source 202, which may be a simple pull-up resistor between the PCIXCAP line and a power source voltage (e.g. 5 volts). A zener device 204 limits the PCIXCAP line to the desired voltage that indicates the maximum clock speed supported by the backplane bus 110. The zener device 204 is preferably a programmable device provided with resistors 206, 208 to set the limit voltage of the zener device and minimize voltage variation that might be caused by power supply variation and varied load configurations that the PCI-X boards can produce.

The PCIXCAP line is coupled to each of the PCI-X connectors in the system, and each of the connectors preferably has a corresponding capacitor 210 to minimize noise. The connectors are shown coupled to a system board and a set of peripheral boards. In the preferred embodiment, the system board controls the initialization of the system and performs system-level duties. The peripheral boards may be any PCI-X or PCI device, but in the preferred embodiment, they contain processing clusters and network interfaces for commercial use. Note, however, that the presently described configuration is intended for explanatory use only, and in no way limits the applicability of the claims.

Figure 3:
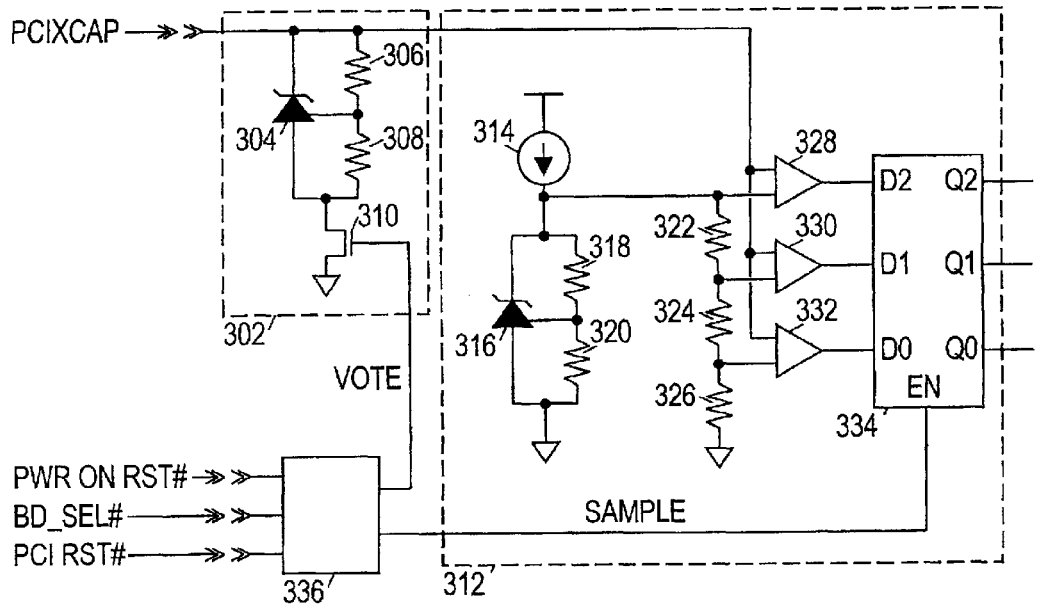
FIG. 3 shows a schematic for a preferred peripheral card capability circuit.

Referring now to FIG. 3, a schematic for the preferred embodiment of the peripheral card portion is shown. The PCIXCAP signal line is coupled to a voting circuit 302 and a sampling circuit 312. These circuits are controlled by digital logic 336, which preferably asserts the vote signal when the bus reset (PCIRST#) signal and the board select (BD_SEL#) signal are asserted. The sample signal, however, is preferably asserted when the PowerOnReset# signal is asserted, the bus reset (PCIRST#) signal is de-asserted, or the board select (BD_SEL#) signal is de-asserted.

The voting circuit 302 preferably includes a field effect transistor (FET) that is controlled by the Vote signal. When the Vote signal is de-asserted, the voting circuit is disabled, and conversely, the voting circuit is enabled when the vote signal is asserted. The vote circuit 302 preferably includes a zener device 304 with program resistors 306, 308. When the voting circuit 302 is enabled, the zener device 304 prevents the voltage on the PCIXCAP line from exceeding the voltage that indicates the maximum clock speed supported by the peripheral card.

The sampling circuit preferably includes a series of reference voltage signals that may be produced as follows. A current source 314 (which may be a pull-up resistor) drives a zener device 316 with program resistors 318, 320. The zener 318 produces a first reference voltage for comparator 328. A series of resistors 322, 324, 326 are coupled to the first reference voltage in a stepped, voltage divider fashion, to produce a second and third reference voltages. The second and third reference voltages are provided to corresponding comparators 330, 332. Note that the first and second reference voltages are preferably placed about midway or slightly less than midway between the allowable voltage settings of the voting circuits, while the third reference voltage is preferably set at about the digital logic "high" threshold.

The three comparators 328, 330, 332 compare the PCIX-CAP signal to the three reference voltages, and produce three corresponding digital level signals D2, D1, D0, each of which are asserted if the PCIXCAP signal exceeds the corresponding reference voltage. The assertion of the sample signal causes a latch 334 to latch the comparator output signals and drive them to the output as Q2, Q1, Q0. The output signals are preferably used by the peripheral card to determine the clock rate of the bus. If none are asserted, the clock rate is 33 MHz. If one is asserted (D0), the clock rate is 66 MHz. If two are asserted (D1, D0), the clock rate is 100 MHz, and so on. As mentioned previously, additional voltages and different clock rates are contemplated. Alternatively, the voting and sampling circuits may be used to select and control other bus capabilities.

Figure 4:
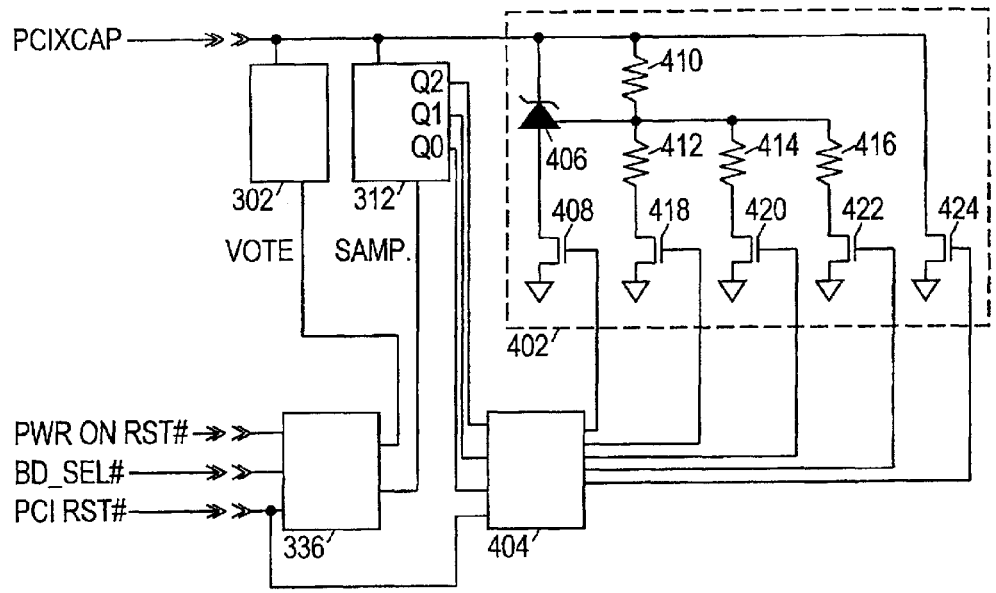
FIG. 4 shows a schematic for a preferred system card capability circuit.

Referring now to FIG. 4, the preferred embodiment of the system card portion is shown. The system card preferably includes a voting circuit 302, a sampling circuit 312, and a digital logic circuit 336 similar to those of the peripheral card. In addition, the system card preferably includes a voltage holding circuit 402 and additional digital logic circuitry 404.

The voltage holding circuit 402 preferably includes a programmable zener device 406 in series with a first FET 408, and includes a resistor 410 in series with a set of parallel resistors 412, 414, 416, each of which can be disabled by a corresponding FET 418, 420, 422. Finally, the voltage holding circuit includes a FET 424 for grounding the PCIXCAP line. After the voting occurs, holding circuit 404 preferably drives on the PCIXCAP line a voltage that represents the capability elected during the voting phase. Thus, a new peripheral card may be added during system operation and can determine from the voltage on PCIXCAP whether or not it may place itself into operation at the presently-established bus frequency. If the new card can operate at that speed, it may participate as soon as its logic recognizes an appropriate bus sequence. If it cannot operate at that speed, it remains offline until the next voting phase occurs (e.g. at the next system reset).

Digital logic circuit 404 receives the output of sampling circuit 312, receives the PCIRST# signal, and provides control signals for each of the FETs 408, 418, 420, 422, 424. When the PCIRST# signal is asserted, all of the control signals are de-asserted to disable the holding circuit. The voting circuits are enabled, the input to sampling circuit 312 is the elected voltage. At the end of the voting phase, the sampling circuit latches the digital representation of the elected voltage. When the PCIRST# signal is de-asserted, logic circuit 404 sets the control signals in accordance with the output from the sampling circuit 312. If none of the outputs Q2, Q1, Q0 are asserted, the control signal for FET 424 is asserted to hold the PCIXCAP line at ground voltage.

If Q0 is asserted, the control signal for FET 424 is de-asserted, and the rest of the control signals are asserted. This programs the zener device 406 to hold the PCIXCAP line at the lowest non-zero voltage setting. If Q0 and Q1 are asserted, the control signals for FETs 422, 424 are de-asserted, and the rest of the control signals are asserted. This holds the PCIXCAP line and the second-lowest non-zero voltage setting. If all the outputs Q2, Q1, Q0 are asserted, then the control signals for FETS 420, 422, 424 are de-asserted, and the rest are asserted. This holds the PCIX-CAP line at the highest voltage setting. Note that if the system card does not support one or more of the highest settings, then the holding circuit may be simplified somewhat with the knowledge that the corresponding voltages will never need to be maintained.

The operation of the voting mechanism is now explained. While the reset signal is asserted (e.g. during a system reset or a system power-up), the backplane circuit (FIG. 2) and the voting circuits of the PCI-X peripheral and system cards are enabled. The component with the smallest zener voltage (or the component having a ground connection) will determine the voltage on the PCIXCAP line. When the bus reset signal is de-asserted, each of the cards latches their measurement of this voltage. Each of the cards then limits its transmissions to the selected clock rate, thereby allowing all cards to participate in bus communications. The system card maintains the PCIXCAP line at the elected voltage. If additional boards are inserted into a running system (e.g. reset is not being asserted), these additional boards observe the voltage on the PCIXCAP signal line. If they can operated at the indicated speed, then they may join the bus. Otherwise, they preferably must wait until voting occurs (e.g. at the next reset) to join the bus.

The preferred embodiment relies on zener diodes to limit the PCIXCAP voltage during voting. This advantageously provides enough signal margin to prevent power variations, component tolerances, and resistive losses from adversely affecting the clock rate determination.

The above discussion is meant to be illustrative of the principles and various embodiments of the present invention. Numerous variations and modifications will become apparent to those skilled in the art once the above disclosure is fully appreciated. For example, many variations on the circuit and digital logic will provide similar results. Also, the described mechanism is suitable for many applications where it is desirable to determine the limits of capabilities shared by multiple components. It is intended that the following claims be interpreted to embrace all such variations and modifications.

What is claimed is:

1. A computer system comprising:
   a backplane that includes:
      multiple sockets;
      a bus that couples the multiple sockets together, wherein the bus includes a capability signal line; and
   a circuit board inserted in one of the multiple sockets, and configured with a zener device to limit a voltage on the capability signal line to one of three or more predetermined values, wherein the predetermined values are indicative of different bus component capability levels.

2. The system of claim 1, wherein the predetermined values are indicative of a maximum bus clock rate supported by the circuit board.

3. The system of claim 1, wherein the circuit board includes a voting circuit that limits the voltage on the capability signal line when the voting circuit is enabled.

4. The system of claim 3, wherein the voting circuit includes said zener device, and said zener device is configured to limit the voltage to less than a predetermined value that is indicative of the capability level of the circuit board.

5. A computer system comprising:
   a backplane that includes:
      multiple sockets;
      a bus that couples the multiple sockets together, wherein the bus includes a capability signal line; and
   a circuit board inserted in one of the multiple sockets, and configured to limit a voltage on the capability signal line to one of three or more predetermined values, wherein the predetermined values are indicative of different bus component capability levels,
   wherein the circuit board includes a voting circuit that limits the voltage on the capability signal line when the voting circuit is enabled,
   wherein the circuit board further includes a sample circuit that latches a digital value indicative of the voltage on the capability signal line.

6. The system of claim 5, wherein the circuit board further includes a hold circuit coupled to the sample circuit to receive the digital value and configured to maintain the capability signal line at a voltage indicated by the digital value when the voting circuit is disabled.

7. The system of claim 1, further comprising multiple circuit boards inserted in corresponding sockets and configured to limit the voltage on the capability signal line to a predetermined value that is indicative of the capability level of the corresponding circuit board, whereby the voltage on the capability signal line is determined by the circuit board having the lowest voltage limit.

8. The system of claim 1, wherein the backplane further includes a circuit to power the capability signal line at a voltage no higher than a predetermined voltage that is indicative of the capability level of the backplane.

9. The system of claim 1, wherein the circuit board includes:
- a processor;
- a memory coupled to the processor;
- a bridge device coupled between the processor and the backplane; and
- an I/O controller coupled to the bridge device.

10. A computer system comprising:
- a processor;
- a memory coupled to the processor;
- a peripheral bus, wherein the peripheral bus includes a capability signal line having a voltage that is limited to a predetermined voltage that is one of three or more predetermined voltages each being indicative of a different capability level;
- a bridge device coupled between the processor and the peripheral bus;
- a long-term storage device coupled to the bridge device; and
- one or more peripheral components coupled to the peripheral bus, wherein each peripheral component is configured with a zener diode to limit the voltage on the capability signal line to a corresponding predetermined voltage that is indicative of a corresponding capability level of the peripheral component.

11. The system of claim 10, wherein the capability level is the maximum bus clock frequency supported by the peripheral component.

12. The system of claim 10, wherein each of the peripheral components includes a voting circuit having zener said diode, and said zener diode is configured for a predetermined voltage corresponding to the capability level of the peripheral component.

13. A computer system comprising:
- a processor;
- a memory coupled to the processor;
- a peripheral bus, wherein the peripheral bus includes a capability signal line having a voltage that is limited to a predetermined voltage that is one of three or more predetermined voltages each being indicative of a different capability level;
- a bridge device coupled between the processor and the peripheral bus;
- a long-term storage device coupled to the bridge device; and
- one or more peripheral components coupled to the peripheral bus, wherein each peripheral component is configured to limit the voltage on the capability signal line to a corresponding predetermined voltage that is indicative of a corresponding capability level of the peripheral component,
- wherein each peripheral component includes a voting circuit that limits the voltage on the capability signal line when a peripheral bus reset signal is asserted.

14. A method of determining a maximum bus clock rate supported by various components, the method comprising:
- coupling the components to a bus having a capability signal line;
- supplying electrical current to the capability signal line, wherein each of the components limits a voltage on the capability signal line to no more than a predetermined voltage that is indicative of a maximum bus clock rate supported by the component, each predetermined voltage being one of a set of three or more predetermined voltages that are indicative of different maximum clock rates;
- setting a bus clock rate to the maximum clock rate associated with the voltage on the capability signal line; and
- asserting a bus reset signal while supplying electrical current to the capability signal line.

15. The method of claim 14, further comprising:
- measuring the voltage on the capability signal line after asserting the bus reset signal; and
- holding the voltage on the capability signal line at the predetermined voltage associated with the bus clock rate.

16. A method of determining a maximum bus clock rate supported by various components, the method comprising:
- coupling the components to a bus having a capability signal line;
- supplying electrical current to the capability signal line, wherein each of the components limits a voltage on the capability signal line to no more than a predetermined voltage that is indicative of a maximum bus clock rate supported by the component, each predetermined voltage being one of a set of three or more predetermined voltages that are indicative of different maximum clock rates; and
- setting a bus clock rate to the maximum clock rate associated with the voltage on the capability signal line,
- wherein the components include zener devices configured in accordance the maximum bus clock rate supported by the components.

17. The method of claim 16, further comprising:
- disabling the zener devices when a bus reset signal is de-asserted.

18. The method of claim 15, further comprising:
- detecting a voltage held on the capability signal line while the bus reset signal is de-asserted; and
- determining if the voltage held on the capability signal line is consistent with a bus capability of a newly added bus component.

19. The method of claim 18, further comprising:
- allowing the newly added bus component to participate in bus transactions if the voltage held on the capability signal line is consistent with the bus capability of the newly added bus component.

20. The method of claim 18, further comprising:
- preventing the newly added bus component from participating in bus transactions until the bus reset signal is next asserted.

* * * * *